(12) United States Patent
Corrigan, III

(10) Patent No.: US 6,901,551 B1
(45) Date of Patent: May 31, 2005

(54) METHOD AND APPARATUS FOR PROTECTION OF DATA UTILIZING CRC

(75) Inventor: Brian E. Corrigan, III, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 510 days.

(21) Appl. No.: 10/022,051

(22) Filed: Dec. 17, 2001

(51) Int. Cl.[7] .................. H03M 13/00; G11C 29/00
(52) U.S. Cl. ......................... 714/763; 714/758
(58) Field of Search ............... 714/763–773, 714/758

(56) References Cited

U.S. PATENT DOCUMENTS

| | | | |
|---|---|---|---|
| 4,387,441 A | * | 6/1983 | Kocol et al. ............ 710/3 |
| 5,355,522 A | | 10/1994 | Demange |
| 5,719,885 A | | 2/1998 | Ofer et al. |
| 5,734,815 A | | 3/1998 | Schatzberg |
| 6,061,822 A | | 5/2000 | Meyer |
| 6,185,207 B1 | | 2/2001 | LaBerge et al. |
| 6,304,992 B1 | | 10/2001 | Cypher |
| 6,516,386 B1 | | 2/2003 | Pang et al. |
| 6,519,733 B1 | | 2/2003 | Har et al. |
| 6,539,503 B1 | | 3/2003 | Walker |
| 6,553,511 B1 | | 4/2003 | DeKoning et al. |
| 6,629,288 B1 | | 9/2003 | Bernath et al. |
| 2003/0093751 A1 | | 5/2003 | Hohl |
| 2003/0115417 A1 | | 6/2003 | Corrigan |

OTHER PUBLICATIONS

Error Detection & Correction Options for Data Services in B-ISDN—Author(s)—Damodaram et al. 1990 IEEE, p. 1751–1757.

Fast CRC Calculation—Author(s)—Glaise et al. 1993 IEEE, p. 602–605.

* cited by examiner

Primary Examiner—Joseph D. Torres
(74) Attorney, Agent, or Firm—Yee & Associates

(57) ABSTRACT

A dedicated hardware CRC computation engine is provided to assure the integrity of data transferred between the system memory and storage devices. The CRC computation engine provides CRC calculation "on-the-fly" for the protection of data transferred to and from the system memory without software overhead. The computation of CRC values and optional checking against previously calculated CRC values is selected through the use of an address-mapping scheme. This CRC protection scheme requires a small amount of initial software overhead to allocate the data, CRC value, and CRC error regions of the system memory. After the CRC protection scheme is initialized, all CRC operations are transparent to the executing software.

30 Claims, 5 Drawing Sheets

METHOD AND APPARATUS FOR PROTECTION OF DATA UTILIZING CRC

BACKGROUND OF THE INVENTION

1. Technical Field

The present invention is directed generally toward a method and apparatus for protection of data utilizing cyclical redundancy checking.

2. Description of the Related Art

In a high-performance computer system consisting of multiple processors and mass storage devices, it is of critical importance that all information be stored and retrieved reliably with no errors. It is of equal importance that if errors occur in the storage or retrieval of data, that the errors be detected and reported. Typically, the mass storage of a high-performance computer system consists of a redundant array of independent disks (RAID). Within the RAID mass storage system, data is stored both in semiconductor memory in the RAID controller and on the magnetic media of the RAID disk drives. Though data written to semiconductor memory can be protected using error correction code (ECC) techniques, this will not prevent against inadvertent writes to locations in the memory or reading from incorrect locations. Furthermore, data stored on the disk drives of a RAID system can be stored incorrectly or retrieved incorrectly due to errors in the drives. For example, the drives may have physical problems, data may be stored in the wrong location on the drive, or the data may become corrupted.

The method by which these errors are detected in the system should have minimum impact on the overall system performance. There are several approaches that may be used to protect data from the above-mentioned errors. One method involves the execution of software that checks the integrity of data as it is being stored or retrieved. This method, used to ensure the accuracy of transmitting digital data, is cyclical redundancy checking (CRC). This operation executes concurrently with the transfer of the data. Because this method utilizes a portion of the computing resources for its execution, the overall performance of the system is reduced. This method adds an additional amount of complexity to the software executing in the RAID system.

Another method involves a hardware engine that checks the integrity of data after it has been transferred. Though this method utilizes a small amount of computing resources to initialize and start the hardware engine, system performance is reduced due to the time required to initialize the engine and execute the checking algorithm. If a separate hardware engine is used to perform the CRC function after a transfer to or from system memory is completed, then the next system operation or transfer would have to wait until this CRC operation is completed before executing. This reduces system performance.

Therefore, it would be advantageous to provide an improved method and apparatus for protection of data using cyclical redundancy code.

SUMMARY OF THE INVENTION

The present invention provides the addition of a dedicated hardware CRC computation engine to assure the integrity of data transferred between the system memory and storage devices. The CRC computation engine provides CRC calculation "on-the-fly" for the protection of data transferred to and from the system memory without software overhead. The computation of CRC values and optional checking against previously calculated CRC values is selected through the use of an address-mapping scheme. This CRC protection scheme requires a small amount of initial software overhead to allocate the data, CRC value, and CRC error regions of the system memory. After the CRC protection scheme is initialized, all CRC operations are transparent to the executing software.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
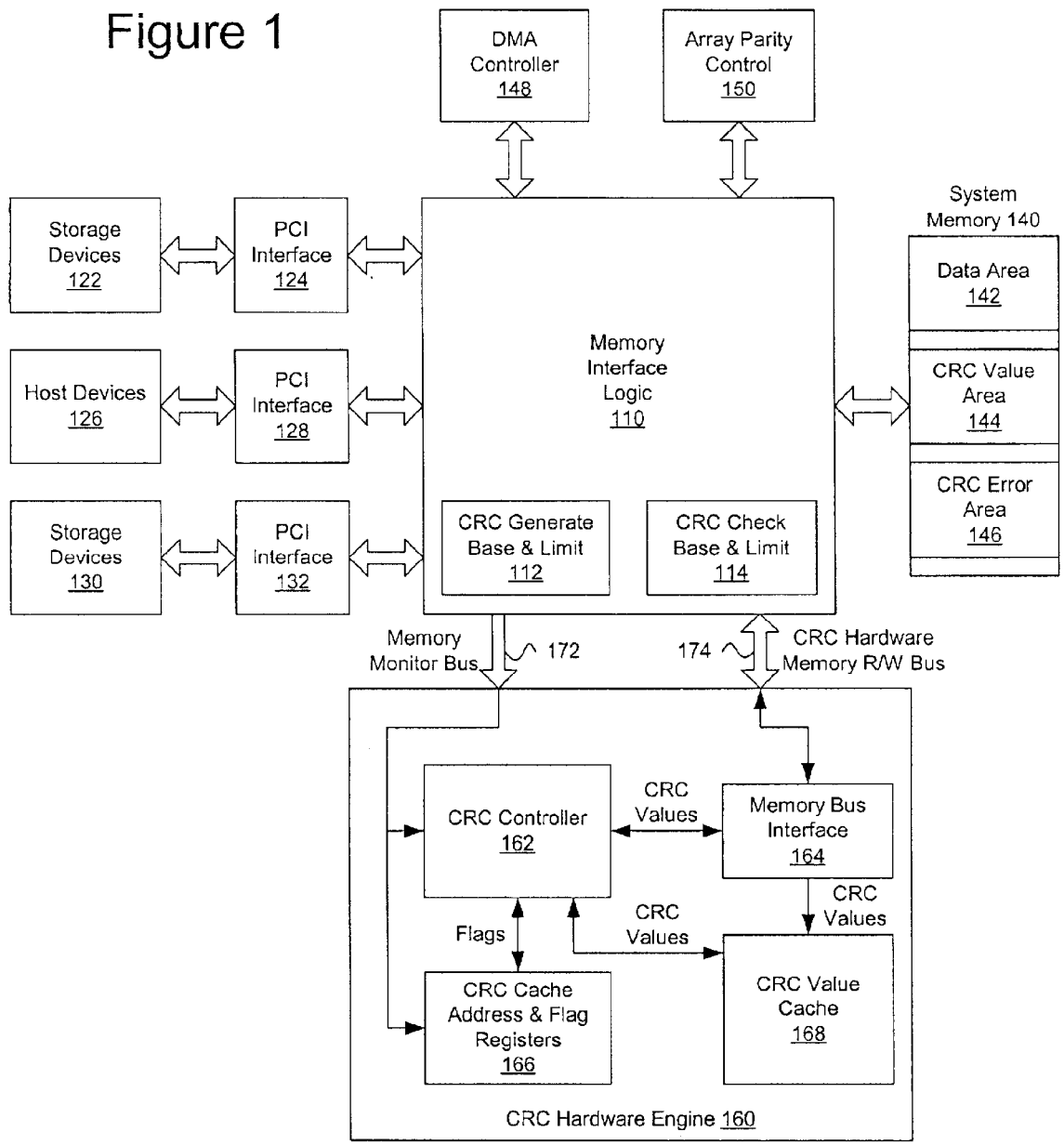
FIG. 1 is a block diagram illustrating a storage system in accordance with a preferred embodiment of the present invention.

With reference now to the figures and in particular with reference to FIG. 1, a block diagram illustrating a storage system is shown in accordance with a preferred embodiment of the present invention. Memory interface logic 110 manages the transfer of data from storage devices 122, 130 and host devices 126 via peripheral component interconnect (PCI) interfaces 124, 128, 132 to system memory 140 and from system memory to the storage devices and host devices. Transfers from devices into system memory are writes and transfers from memory to devices are reads.

For example, host devices 126 may write data to system memory 140 in data area 142 for subsequent storage in one of storage devices 122, 130. As another example, data may be written from one of storage devices 122, 130 to system memory and read from system memory to be transferred to one of host devices 126. Direct memory access (DMA) controller 148 also transfers blocks of data from memory to storage devices. Furthermore, array parity control 150 takes data in blocks of memory performs calculations, and creates new data. The array parity control is used in striping data across storage devices.

In accordance with a preferred embodiment of the present invention, CRC hardware engine 160 is provided to assure the integrity of data transferred between the system memory and storage devices accessed through PCI buses. The CRC hardware engine provides CRC calculation on the fly for protection of data transferred to or from the system memory without software overhead.

The computation of CRC values and optional checking against previously calculated CRC values is selected through the use of a unique PCI address-mapping scheme. The system memory is accessed in one of three modes: normal, generate, and check. In a CRC generate mode access, the PCI address of a memory transfer falls within the range of the CRC Generate base and limit registers 112. For this transfer, a CRC value is calculated and written to CRC value area 144 of system memory by the CRC hardware engine.

In a CRC check mode access, the PCI address of a memory transfer falls within the range of the CRC check base and limit registers 114. For this transfer, a CRC value is calculated and compared against a previously generated CRC value in the CRC value area of the system memory. If the computed value for the data transfer does not compare against the previously computed value, an error in the data is detected. A transfer of error information to CRC error area 146 of system memory by the CRC hardware engine reports the error. In a normal mode access, the PCI address of a memory transfer does not fall within either the CRC generate or CRC check regions.

CRC hardware engine 160 interfaces to memory interface logic 110 via memory monitor bus 172 and CRC hardware memory read/write bus 174. The memory monitor bus provides a status of the current system memory activity to the CRC hardware engine. The starting address, active port identification (ID), data direction, and data for each transaction to or from the system memory is output from the memory interface logic on the memory monitor bus. Additionally, the port indicates to the CRC hardware engine whether the data transfer falls within the CRC Generate region or the CRC Check region. The CRC hardware memory read/write bus is used by the CRC hardware engine to read previously computed CRC values from system memory and to write newly computed CRC values to system memory. CRC hardware memory read/write bus 174 is also used to write CRC error information to system memory.

When a generate memory transfer begins, CRC controller 162 begins calculation of the CRC value. The CRC controller may use, for example, the CRC-32 polynomial to calculate the remainder. As each 128-bit memory word is presented at the memory monitor bus, the calculation is updated. A CRC remainder is calculated on a block-by-block basis. When the transfer is completed, the CRC hardware engine writes the calculated CRC values to the system memory via memory bus interface 164.

When a check memory transfer begins, CRC controller 162 reads previously computed CRC values for the memory block being transferred via memory bus interface 164. If CRC cache address and flag registers 166 detect that CRC values are already cached, appropriate flags are presented to CRC controller 162 and the values are read from CRC value cache 168 rather than system memory. The CRC remainder calculation then begins with the first word presented at the memory monitor bus and continues until the end of a block is reached. The computed value is compared with the previously computed value to determine if an error is present. If the CRC controller detects an error, the appropriate error information for the block is written to CRC error area 146 of system memory via memory bus interface 164. The CRC controller may also inform the memory interface logic of the error by, for example, setting an interrupt, generating PCI system errors (PCI SERR), setting status bits, etc.

Figure 2:
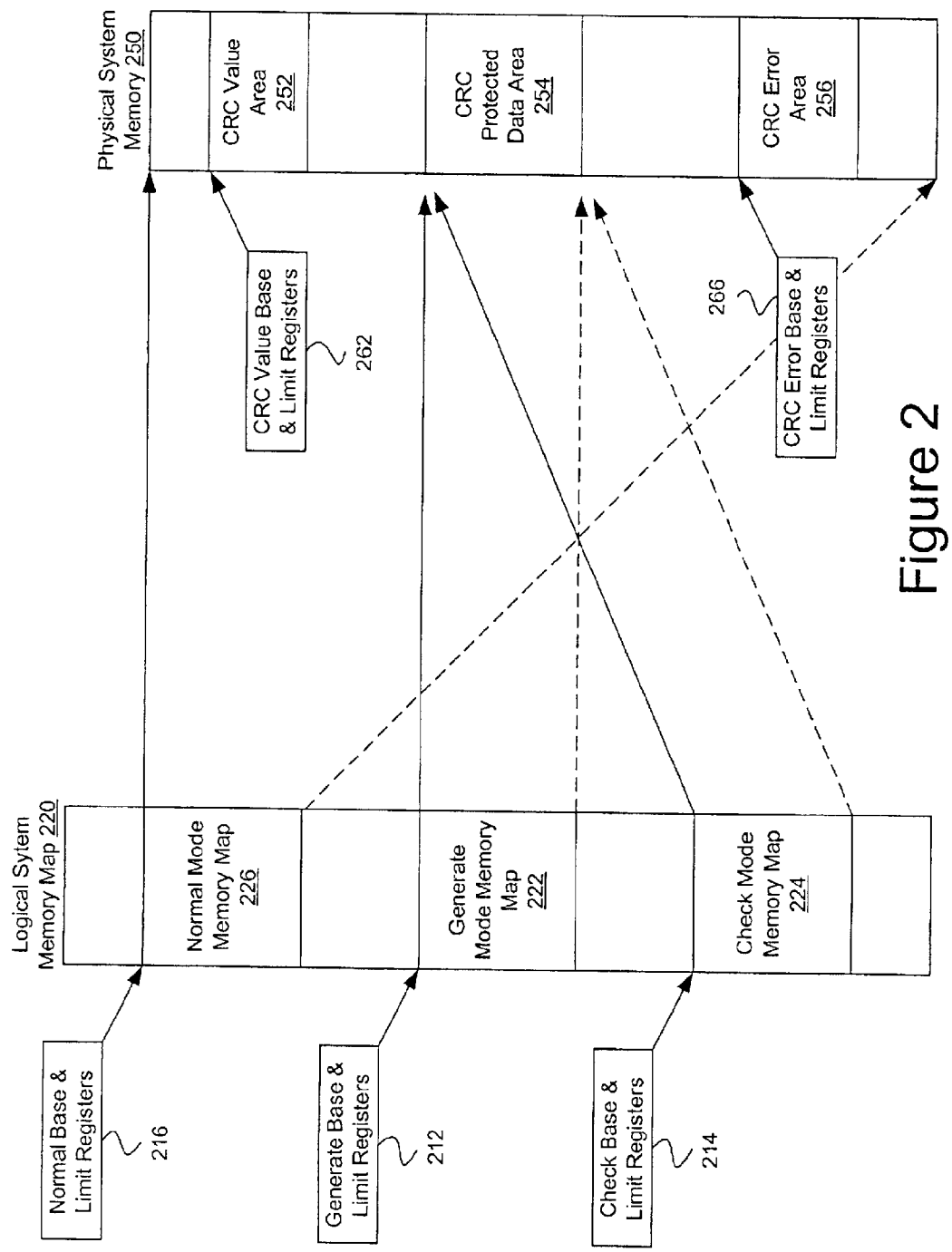
FIG. 2 is a block diagram depicting an example of logical system memory mapping in accordance with a preferred embodiment of the present invention.

Turning to FIG. 2, a block diagram depicting an example of logical system memory mapping is shown in accordance with a preferred embodiment of the present invention. The memory interface logic includes logical memory map 220 that maps an address space to physical system memory 250. The logical system memory map includes generate mode memory map 222 and check mode memory map 224. The generate mode memory map address range is defined by generate base and limit registers 212 and the check mode memory map address range is defined by check base and limit registers 214. As can be seen in FIG. 2, the generate mode memory map and the check mode memory map both map addresses to CRC protected data area 254 in physical system memory 250.

A normal mode access may comprise a transfer for any address not between the generate base and limit or between the check base and limit. Alternatively, logical system memory map 220 may include normal mode memory map 226. The address range for the normal mode memory map may be defined by normal base and limit registers 216. The normal mode memory map may map addresses to physical system memory that is not in CRC value area 252, CRC protected data area 254, or CRC error area 256. However, other mapping schemes may also be used. For example, the normal mode memory map may map addresses to the CRC protected data area. In this case, the data in a normal mode access may be protected, but a CRC will not be computed or compared for the transfer.

Physical system memory 250 may also include CRC value area 252 for storing CRC values and CRC error area 256 for storing CRC errors discovered by the CRC hardware engine. The CRC value area address range is defined by CRC value base and limit registers 262. The CRC error area address range is defined by CRC error base and limit registers 266.

Figure 3:
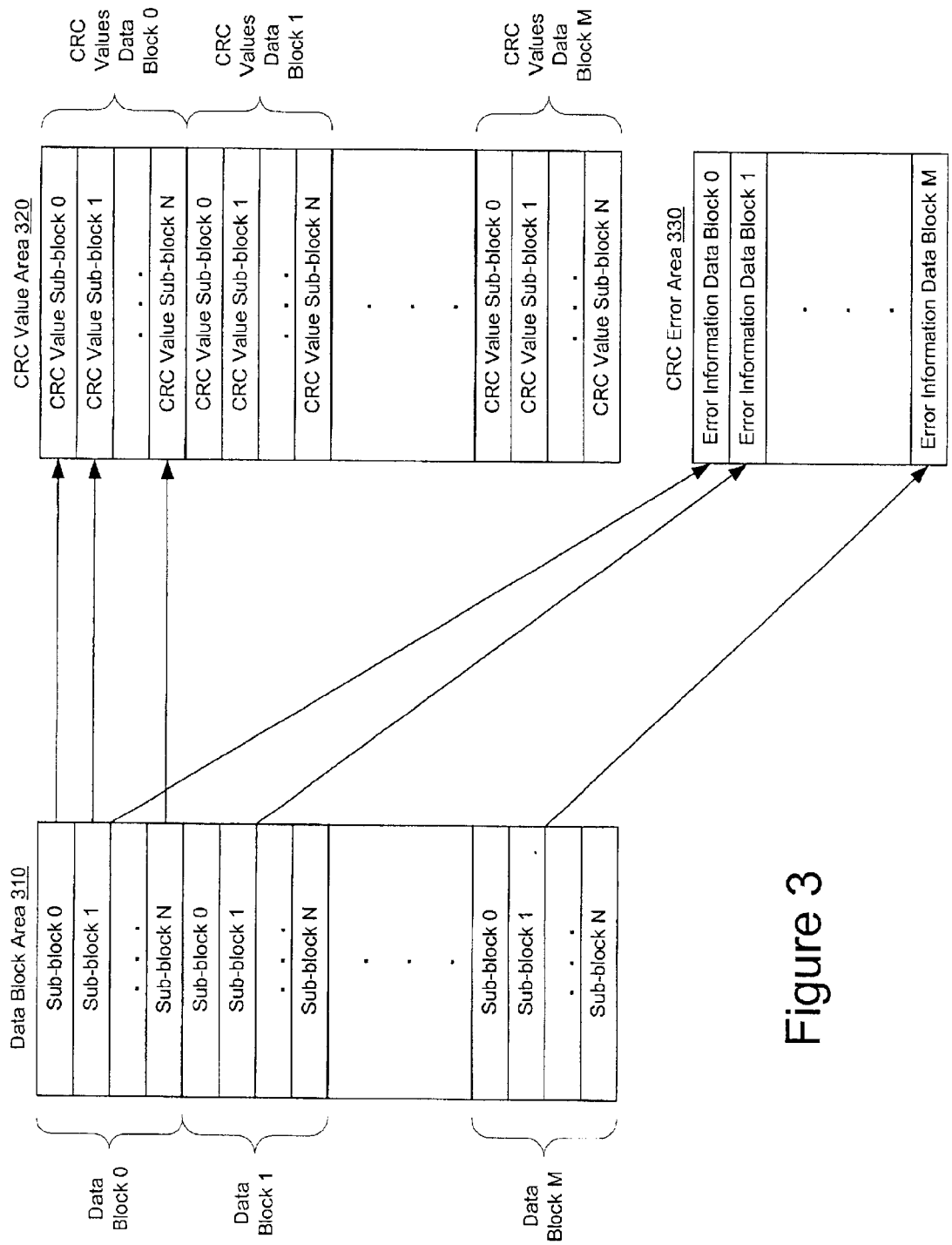
FIG. 3 is a block diagram illustrating data block area and CRC value area in system memory in accordance with a preferred embodiment of the present invention.

Turning to FIG. 3, a block diagram illustrating data block area and CRC value area in system memory is shown in accordance with a preferred embodiment of the present invention. Data block area 310 includes data blocks 0–M. Each data block in the data block area has a corresponding CRC value block in CRC value area 320 and an error information data block in CRC error area 330.

Furthermore, each data block may be divided into sub blocks 0–N. Each data sub-block may have a corresponding CRC value sub-block in the CRC value area. Thus, when a transfer is not completed, the memory interface logic may restart with the next sub-block and the CRC hardware engine can continue generating or checking CRC values on a sub-block basis until the transfer is complete. In the eventuality that a transfer stops within a data sub-block, typically during a write transfer, the CRC hardware engine may store an intermediate value in system memory. In a preferred embodiment of the present invention, the intermediate value is stored in an unused portion of the CRC error area. When the transfer restarts, the CRC hardware engine may retrieve the intermediate value from system memory and resume.

Figure 4:
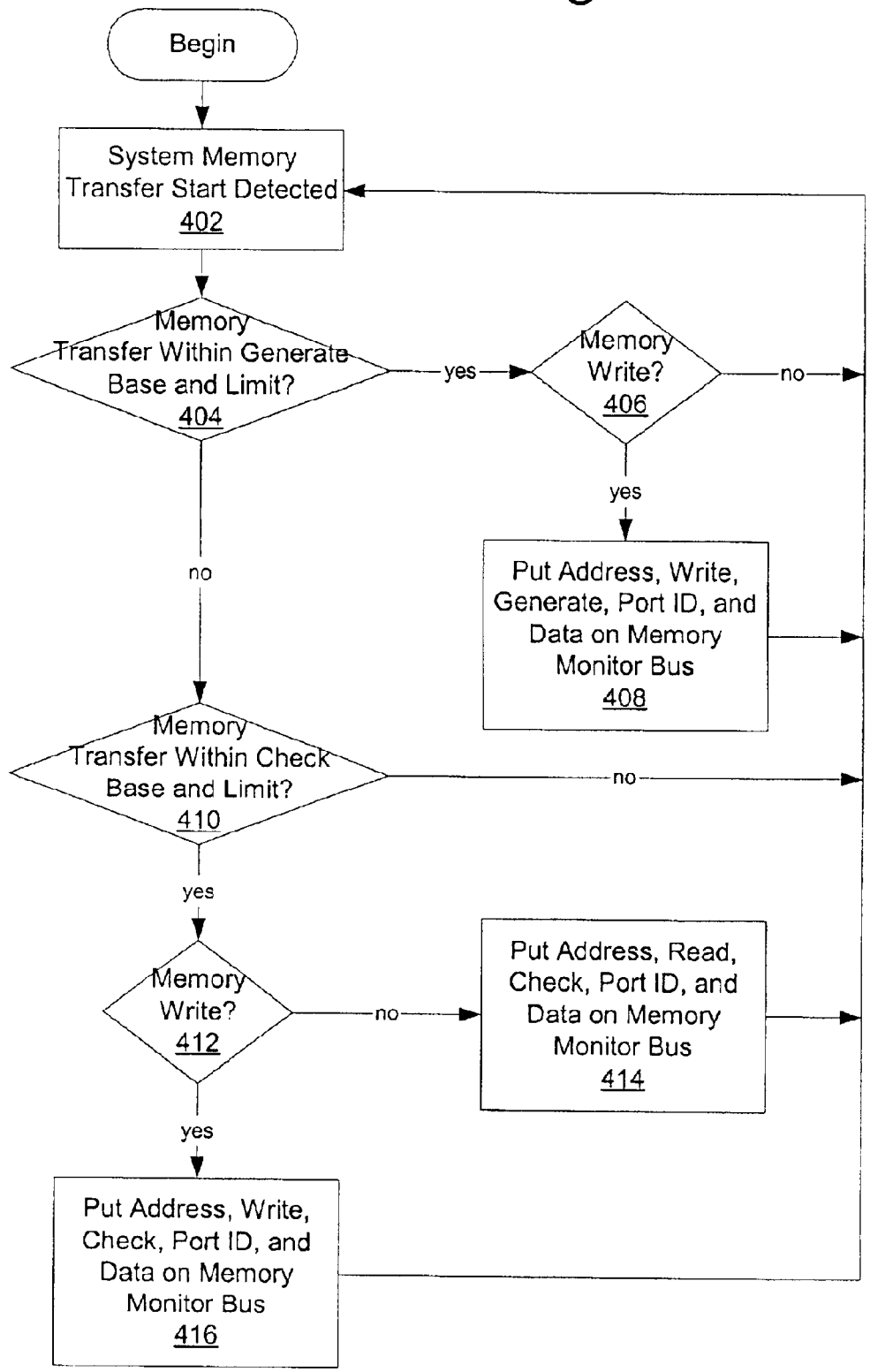
FIG. 4 is a flowchart depicting the operation of memory interface logic in accordance with a preferred embodiment of the present invention.

With reference now to FIG. 4, a flowchart depicting the operation of memory interface logic is shown in accordance with a preferred embodiment of the present invention. The process begins and a system memory transfer start is detected (step 402). A determination is made as to whether the memory transfer is within the generate base and limit range (step 404). If the transfer is a generate, a determination is made as to whether the transfer is a memory write (step 406). If the transfer is a memory write, the process puts the address, a write indication, a generate indication, the port ID, and the data on the memory monitor bus (step 408) and returns to step 402 to detect another system memory transfer. If the transaction is not a memory write in step 406, the process returns to step 402 to detect another system memory transfer.

If the transfer is not a generate in step 404, a determination is made as to whether the memory transfer is within the check base and limit range (step 410). L the transaction is a check, a determination is made as to whether the transaction is a memory write (step 412). If the transfer is not a memory write, the process puts the address, a read indication, a check indication, the port ID, and the data on the memory monitor bus (step 414) and returns to step 402 to detect another system memory transfer.

If the transfer is a memory write in step 412, the process puts the address, a write indication, a check indication, the port ID, and the data on the memory monitor bus (step 416) and returns to step 402 to detect another system memory transfer. Returning to step 410, if the transaction is not a check, the process returns to step 402 to detect another system memory transfer.

Figure 5:
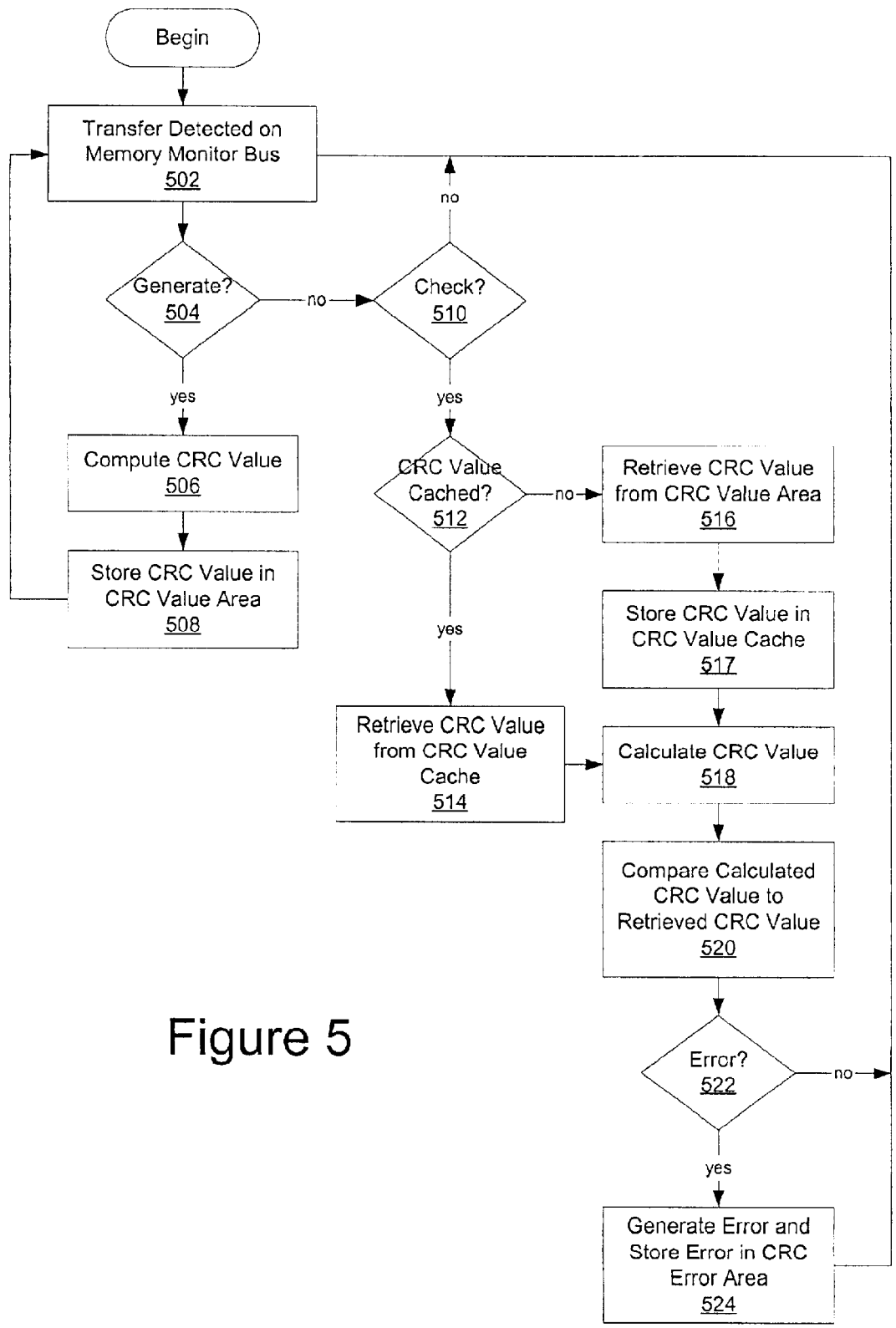
FIG. 5 is a flowchart illustrating the operation of a CRC hardware engine in accordance with a preferred embodiment of the present invention.

Turning now to FIG. 5, a flowchart illustrating the operation of a CRC hardware engine is depicted in accordance with a preferred embodiment of the present invention. The process begins and a transfer is detected on the memory monitor bus (step 502). Then, determination is made as to whether the transfer is a generate (step 504). If the transfer is a generate, the process computes the CRC value (step 506), stores the CRC value in the CRC value area of system memory (step 508), and returns to step 502 to detect another transfer.

If the transfer is not a generate in step 504, a determination is made as to whether the transfer is a check (step 510). If the transfer is not a check, the process returns to step 502 to detect another transfer. However, if the transfer is a check in step 510, a determination is made as to whether the CRC value is cached (step 512). If the CRC value is cached, the process retrieves the CRC value from the CRC value cache (step 514), and if the CRC value is not cached, the process retrieves the CRC value from the CRC value area in system memory (step 516) and stores the CRC value in the CRC value cache (step 517). Thereafter, the process calculates a CRC value (step 518) and compares the calculated CRC value to the retrieved CRC value (step 520).

Next, a determination is made as to whether an error is detected based on the comparison (step 522). If an error is detected, the process generates an error and stores the error in the CRC error area of system memory (step 524). Then, the process returns to step 502 to detect another transfer. If an error is not detected in step 522, the process returns to step 502 to detect another transfer.

Thus, the present invention solves the disadvantages of the prior art by providing a dedicated hardware CRC computation engine to the memory interface integrated circuit to assure the integrity of data transferred between the system memory and storage devices. The CRC protection scheme of the present invention requires a small amount of initial software overhead to allocate the data, CRC value, and CRC error regions of the system memory. After the regions are allocated and the CRC generate and CRC check region registers are initialized, all CRC operations are transparent to the executing software. The calculations and optional checking occur "on-the-fly" simultaneously with the transfer of the data to or from the system memory. A small amount of additional memory bandwidth is required to perform the function. This allows for a much higher performance system than otherwise obtained if system processing resources were used to compute the CRC values and perform the checking.

What is claimed is:

1. A method for protecting a data transfer, comprising:
   receiving a data transfer request, wherein the data transfer request comprises a request address;
   determining whether the request address is within a generate address range;
   sending generate information to a hardware computation engine in response to the request address being within the generate address range;
   receiving a cyclical redundancy check value from the hardware computation engine; and
   storing the cyclical redundancy check value.

2. The method of claim 1, wherein the generate address range is defined by generate base and limit registers.

3. The method of claim 1, wherein the hardware computation engine calculates the cyclical redundancy check value simultaneously with the data transfer.

4. The method of claim 1, wherein the generate address range maps to a protected data area in memory.

5. The method of claim 4, wherein the data transfer request is a write request.

6. The method of claim 5, further comprising writing data for the data transfer request into the protected data area.

7. The method of claim 1, further comprising:
   determining whether the request address is within a check address range if the request address is not within a generate address range;
   sending check information to the hardware computation engine;
   receiving a cyclical redundancy check result from the hardware computation engine.

8. The method of claim 7, further comprising:
   performing the data transfer without cyclical redundancy protection if the request address is not within the generate address range or the check address range.

9. The method of claim 7, wherein the generate address range and the check address range both map to a protected data area in memory.

10. The method of claim 1, wherein the generate information includes the request address and data to be transferred.

11. A method for protecting a data transfer, comprising:
    receiving a data transfer request, wherein the data transfer request comprises a request address;
    determining whether the request address is within a check address range;
    sending check information to a hardware computation engine in response to the request address being within the check address range; and
    receiving a cyclical redundancy check result from the hardware computation engine.

12. The method of claim 11, wherein the check address range is defined by check base and limit registers.

13. The method of claim 11, wherein the hardware computation engine checks the cyclical redundancy check value simultaneously with the data transfer.

14. The method of claim 11, wherein the cyclical redundancy check result includes error information.

15. The method of claim 14, further comprising storing the error information.

16. The method of claim 11, wherein the check address range maps to a protected data area in memory.

17. The method of claim 16, wherein the data transfer request is a write request.

18. The method of claim 17, further comprising writing data for the data transfer request into the protected data area.

19. The method of claim 16, wherein the data transfer request is a read request.

20. The method of claim 19, further comprising reading data for the data transfer request from the protected data area.

21. An apparatus for protecting a data transfer, comprising:

a memory interface logic;

a system memory coupled to the memory interface logic;

a hardware computation engine, wherein the hardware computation engine is coupled to the memory interface logic by a memory monitor bus and a memory read/write bus, wherein the memory interface logic receives a data transfer request, wherein the data transfer request comprises a request address; determines whether the request address is within a generate address range; sends generate information to a hardware computation engine via the memory monitor bus in response to the request address being within the generate address range; receives a cyclical redundancy check value from the hardware computation engine via the memory read/write bus; and stores the cyclical redundancy check value in the system memory.

22. The apparatus of claim 21, wherein the generate address range is defined by generate base and limit registers.

23. The apparatus of claim 21, wherein the hardware computation engine calculates the cyclical redundancy check value simultaneously with the data transfer.

24. The apparatus of claim 21, wherein the generate address range maps to a protected data area in the system memory.

25. An apparatus for protecting a data transfer, comprising:

a memory interface logic;

a system memory coupled to the memory interface logic;

a hardware computation engine, wherein the hardware computation engine is coupled to the memory interface logic by a memory monitor bus and a memory read/write bus, wherein the memory interface logic receives a data transfer request, wherein the data transfer request comprises a request address; determines whether the request address is within a check address range; sends check information to a hardware computation engine via the memory monitor bus in response to the request address being within the check address range; and receives a cyclical redundancy check result from the hardware computation engine via the memory read/write bus.

26. The apparatus of claim 25, wherein the check address range is defined by check base and limit registers.

27. The apparatus of claim 25, wherein the hardware computation engine checks the cyclical redundancy check value simultaneously with the data transfer.

28. The apparatus of claim 25, wherein the cyclical redundancy check result includes error information.

29. The apparatus of claim 28, wherein the memory interface logic stores the error information.

30. The apparatus of claim 25, wherein the check address range maps to a protected data area in the system memory.

* * * * *